US011335978B2

United States Patent
Chen et al.

(10) Patent No.: US 11,335,978 B2
(45) Date of Patent: May 17, 2022

(54) SECONDARY BATTERY AND BATTERY MODULE

(71) Applicant: Contemporary Amperex Technology Co., Limited, Ningde (CN)

(72) Inventors: Yuanbao Chen, Ningde (CN); Rui Yang, Ningde (CN); Dongyang Shi, Ningde (CN); Ning Chen, Ningde (CN); Fei Hu, Ningde (CN); Zhenhua Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 392 days.

(21) Appl. No.: 16/424,058

(22) Filed: May 28, 2019

(65) Prior Publication Data

US 2020/0212407 A1 Jul. 2, 2020

(30) Foreign Application Priority Data

Dec. 29, 2018 (CN) .......................... 201811641919.3

(51) Int. Cl.
*H01M 10/04* (2006.01)
*H01M 50/531* (2021.01)
*H01M 50/20* (2021.01)

(52) U.S. Cl.
CPC ..... *H01M 50/531* (2021.01); *H01M 10/0431* (2013.01); *H01M 50/20* (2021.01)

(58) Field of Classification Search
CPC ............... H01M 50/531; H01M 50/20; H01M 10/0431; H01M 50/502; H01M 50/538;
(Continued)

(56) References Cited

U.S. PATENT DOCUMENTS 7,736,797 B2 * 6/2010 Kim .................. H01M 10/0413
429/161
8,734,974 B2 * 5/2014 Lee .................... H01M 50/536
429/177
(Continued)

FOREIGN PATENT DOCUMENTS

CN 108198989 A 6/2018
CN 108199072 A 6/2018
(Continued)

OTHER PUBLICATIONS

Extended European Search Report for European Application No. 19180052.3, dated Feb. 10, 2020 ,7 pages.
(Continued)

*Primary Examiner* — Kaity V Chandler
(74) *Attorney, Agent, or Firm* — Law Offices of Liaoteng Wang (57) ABSTRACT

The disclosure relates to a secondary battery and a battery module. The secondary battery comprises: a case comprising a receiving hole having an opening; a cap assembly sealingly connected with the case to close the opening; an electrode assembly disposed in the receiving hole, wherein the electrode assembly comprises two end surfaces opposite to each other in a first direction perpendicular to an axial direction of the receiving hole and tabs extending from respective end surfaces, and the electrode assembly comprises two or more electrode units which are stacked in the axial direction; and a current collecting unit comprising a first sheet and a first current collecting sheet connected to the first sheet, wherein both the first sheet and the first current collecting sheet extend in the axial direction, and the tab is bent with respect to the first direction and is electrically connected to the first current collecting sheet.

17 Claims, 9 Drawing Sheets

(58) Field of Classification Search
CPC ........... H01M 50/103; H01M 10/0525; H01M 10/052; H01M 50/543; H01M 10/0587; H01M 50/116; H01M 50/10; H01M 2220/20; H01M 10/0585; H01M 2220/30; H01M 10/0436; H01M 50/54; H01M 10/058; H01M 50/172; H01M 50/528; H01M 10/0413; H01M 4/661; H01M 50/183; H01M 50/572; H01M 4/13; H01M 10/04; H01M 4/131; H01M 2004/021; H01M 50/463; H01M 4/70; H01M 4/525; H01M 50/147; H01M 10/0583; H01M 10/425; H01M 50/124; H01M 50/557; H01M 4/485; H01M 10/0565; H01M 50/411; H01M 4/505; H01M 50/107; H01M 2004/028; H01M 6/10; H01M 50/50; H01M 10/4235; H01M 4/587; H01M 50/209; H01M 4/139; H01M 4/0404; H01M 2004/027; H01M 50/578; H01M 4/133; H01M 4/62; H01M 50/166; H01M 4/366; Y02E 60/10; Y02P 70/50

See application file for complete search history.

(56) References Cited

U.S. PATENT DOCUMENTS

| | | | | |
|---|---|---|---|---|
| 2006/0024578 | A1* | 2/2006 | Lee | H01M 10/0431 429/94 |
| 2006/0051664 | A1* | 3/2006 | Tasai | H01M 50/54 429/211 |
| 2008/0206628 | A1* | 8/2008 | Honbou | H01M 10/613 429/94 |
| 2010/0247989 | A1* | 9/2010 | Kim | H01M 4/70 429/94 |
| 2011/0250491 | A1* | 10/2011 | Kim | H01M 50/10 429/176 |
| 2012/0052349 | A1* | 3/2012 | Kim | H01M 50/543 429/94 |
| 2012/0088138 | A1* | 4/2012 | Munenaga | H01M 50/538 429/94 |
| 2012/0231318 | A1* | 9/2012 | Buck | H01M 50/503 429/120 |
| 2014/0255768 | A1* | 9/2014 | Jang | H01M 50/561 429/211 |
| 2014/0349149 | A1 | 11/2014 | Kim | |
| 2014/0377638 | A1* | 12/2014 | Kwak | H01M 50/35 429/178 |
| 2015/0171384 | A1* | 6/2015 | Kim | H01M 50/502 429/149 |
| 2015/0325855 | A1* | 11/2015 | Kawakami | H01M 4/623 361/679.55 |
| 2017/0279157 | A1 | 9/2017 | Lee et al. | |
| 2018/0102536 | A1* | 4/2018 | Kawakami | H01G 11/24 |
| 2019/0103596 | A1* | 4/2019 | Muroya | H01M 50/528 |
| 2019/0221825 | A1* | 7/2019 | Lee | H01M 10/0525 |
| 2020/0235370 | A1* | 7/2020 | Chen | H01M 10/0431 |

FOREIGN PATENT DOCUMENTS

| | | |
|---|---|---|
| CN | 108598353 A | 9/2018 |
| CN | 208014792 U | 10/2018 |
| CN | 208014793 U | 10/2018 |
| CN | 209217068 U | 8/2019 |
| CN | 209217104 U | 8/2019 |
| CN | 209217105 U | 8/2019 |
| CN | 209232866 U | 8/2019 |
| CN | 209298235 U | 8/2019 |
| EP | 2557609 A1 | 2/2013 |
| JP | 2007-73317 A | 3/2007 |
| WO | 2016088535 A1 | 6/2016 |

OTHER PUBLICATIONS

International Search Report for PCT application No. PCT/CN2019/119939, dated Mar. 2, 2020, 11 pages.

The First Office Action and search report for EP Application No. 19180052.3, dated Nov. 5, 2020, 5 pages.

* cited by examiner

SECONDARY BATTERY AND BATTERY MODULE

CROSS-REFERENCE TO RELATED APPLICATION

This application is based on and claims priority to Chinese Patent Application No. 201811641919.3 filed on Dec. 29, 2018, which is incorporated herein by reference in its entirety.

FIELD

The disclosure relates to the technical field of battery, and in particular to a secondary battery and a battery module.

BACKGROUND

With the development of science and technology, secondary batteries are widely used in portable electronic devices such as mobile phones, digital video cameras and laptop computers, and may be widely used in large and medium-sized electric devices such as energy storage facilities and electric vehicles, such as electric cars and electric bicycles. The secondary battery becomes important technical means to solve global problems such as energy crisis and environmental pollution. In the prior art, a secondary battery includes an electrode assembly and a current collecting unit connected to the electrode assembly. The electrode assembly comprises an end surface and a tab extending from the end surface. Since the preformed gap between the current collecting unit and the end surface is small, it is difficult to use a welding device to weld the current collecting unit and the tab, and thereby welding defect may occur at the current collecting unit and the tab.

SUMMARY

According to embodiments of the disclosure, there is provided a secondary battery and a battery module. The tab of the secondary battery can be connected to the cap assembly through the current collecting unit. The current collecting unit according to embodiments has a simple and compact structure, and it is advantageous to increase the energy density of the secondary battery.

In one aspect, embodiments of the disclosure provide a case comprising a receiving hole having an opening; a cap assembly sealingly connected with the case to close the opening; an electrode assembly disposed in the receiving hole, wherein the electrode assembly comprises two end surfaces opposite to each other in a first direction perpendicular to an axial direction of the receiving hole and tabs extending from respective end surfaces, and the electrode assembly comprises two or more electrode units which are stacked in the axial direction; and a current collecting unit comprising a first sheet and a first current collecting sheet connected to the first sheet, wherein both the first sheet and the first current collecting sheet extend in the axial direction, and the tab is bent with respect to the first direction and is electrically connected to the first current collecting sheet.

According to an aspect of embodiments of the disclosure, the first current collecting sheet comprises a first connecting end connected to the first sheet, and the first connecting end extends in a second direction perpendicular to both the axial direction and the first direction.

According to an aspect of embodiments of the disclosure, the first current collecting sheet is disposed at a side of the first sheet close to the case, and the tab is fixedly connected to a surface of the first current collecting sheet away from the first sheet.

According to an aspect of embodiments of the disclosure, the current collecting unit further comprises a second current collecting sheet connected to the first sheet, wherein both the first current collecting sheet and the second current collecting sheet extend in the axial direction, the first current collecting sheet and the second current collecting sheet are disposed to at least partly overlap with each other in the axial direction, and there are two electrode assemblies stacked in the axial direction, wherein the tab of one of the two electrode assemblies is electrically connected to the first current collecting sheet, and the tab of the other of the two electrode assemblies is electrically connected to the second current collecting sheet.

According to an aspect of embodiments of the disclosure, both the first current collecting sheet and the second current collecting sheet are disposed at a side of the first sheet close to the case, and the first current collecting sheet and the second current collecting sheet extend toward each other.

According to an aspect of embodiments of the disclosure, the first sheet comprises a body portion extending in the axial direction and a first extending portion connected to the body portion, wherein the first extending portion extends outside of the body portion in the second direction perpendicular to both the axial direction and the first direction, and the first current collecting sheet and the second current collecting sheet are connected to two ends of the first extending portion in the axial direction, respectively.

According to an aspect of embodiments of the disclosure, the first sheet further comprises a second extending portion connected to the body portion, wherein the first extending portion and the second extending portion are spaced apart in the axial direction to form a clearance notch, and in the axial direction, the clearance notch is disposed at a side of the first current collecting sheet close to the cap assembly, and the tab is able to pass through the clearance notch to connect with the first current collecting sheet.

According to an aspect of embodiments of the disclosure, the clearance notch extends in the second direction beyond the first current collecting sheet.

According to an aspect of embodiments of the disclosure, in the axial direction, at least a part of the first extending portion overlaps with the second extending portion.

According to an aspect of embodiments of the disclosure, the current collecting unit further comprises a second sheet connected to the cap assembly, wherein the body portion and the second sheet are disposed to intersect with each other, and the first sheet, the second sheet, the first current collecting sheet and the second current collecting sheet are integrally formed.

According to an aspect of embodiments of the disclosure, there are two current collecting units, wherein in the first direction, the electrode assembly is disposed between the two current collecting units, and the two current collecting units are connected to respective tabs through the first current collecting sheets.

According to an aspect of embodiments of the disclosure, there are two electrode assemblies stacked in the axial direction, wherein each electrode assembly comprises two electrode units, the electrode unit comprises a sub-end-surface and a sub-tab extending from the sub-end-surface, two sub-end-surfaces at a same side form the end surface, two sub-tabs at a same side connect together and form the tab, and the sub-tab of one electrode unit extends in the axial direction from a side of the sub-end-surface close to the other electrode unit.

According to an aspect of embodiments of the disclosure, the electrode unit comprises two wide surfaces and two narrow surfaces for connecting the two wide surfaces, wherein the two wide surfaces are disposed opposite to each other in the axial direction, the wide surfaces and the narrow surfaces are alternatively disposed, and the tab extends from a region of the end surface close to the two adjacent wide surfaces of the two electrode units.

According to embodiments of the disclosure, the secondary battery comprises a case having a receiving hole, an electrode assembly disposed within the case, and a current collecting unit for inputting electric energy to the electrode assembly or outputting electric energy from the electrode assembly. The current collecting unit comprises a first sheet and a first current collecting sheet connected to the first sheet. Both the first sheet and the first current collecting sheet extend in the axial direction. Since the first sheet is close to the electrode assembly while the first current collecting sheet is away from the electrode assembly, a clearance space can be formed, which facilitates the welding of the first current collecting sheet and the tab through a welding device. Thereby, the welding difficulty can be effectively reduced and welding quality can be improved. On the other hand, since the first current collecting sheet extends in the axial direction, the occupied space in the first direction can be reduced, and it is also advantageous to increase the energy density of the secondary battery.

In another aspect, embodiments of the disclosure provide a battery module comprising two or more secondary batteries according to the above embodiments which are arranged side by side.

BRIEF DESCRIPTION OF THE DRAWINGS

Features, advantages, and technical effects of exemplary embodiments of the disclosure will be described below with reference to accompanying drawings.

The views are not necessarily plotted in actual proportion in the drawings.

REFERENCE SIGNS IN THE DRAWINGS

10 secondary battery;
11 case;
11a receiving hole;
12 cap assembly;
121 cap plate;
122 electrode terminal;
13 electrode assembly;
13a end surface;
13b tab;
131 electrode unit;
131a wide surface;
131b narrow surface;
131c sub-end-surface;
131d sub-tab;
14 current collecting unit;
14a first current collecting sheet;
14b second current collecting sheet;
14c first connecting end;
14d second connecting end;
141 first sheet;
141a body portion;
141b first extending portion;
141c second extending portion;
141d clearance notch;
142 second sheet;
142a protrusion;
X axial direction;
Y first direction;
Z second direction;
20 battery module.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure. That is, the disclosure is not limited to the described embodiments.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", "third" and the like are configured for descriptive purposes only and are not to be construed as indicating or implying relative importance.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

For better understanding of the disclosure, a battery module 20 and a secondary battery 10 according to embodiments of the disclosure will be described below in detail with reference to FIGS. 1 to 8.

Figure 1:
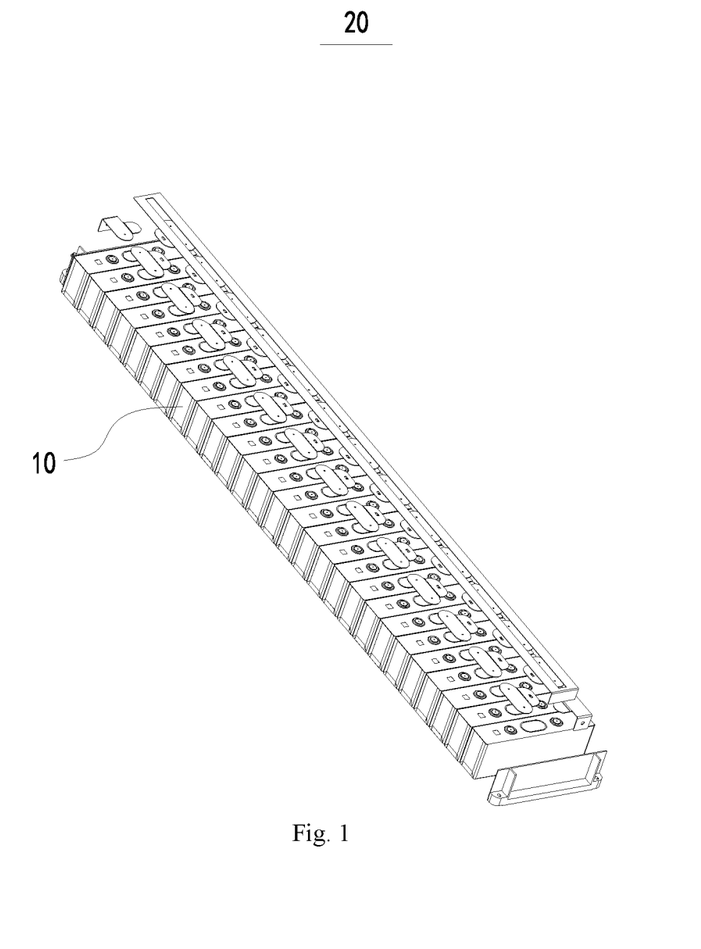
FIG. 1 is a structural schematic diagram of a battery module according to an embodiment of the disclosure.

As shown in FIG. 1, the embodiments of the disclosure further provide a battery module 20, comprising two or more secondary batteries 10 according to the embodiment and a busbar for connecting two of the secondary batteries 10. The two or more secondary batteries 10 are arranged side by side in one direction. One end of the busbar is fixedly connected to one of two secondary batteries 10, and the other end of the busbar is fixedly connected to the other one of the two secondary batteries 10. The two or more secondary batteries 10 according to the embodiment are arranged side by side in their thickness direction to form the battery module 20.

Figure 2:
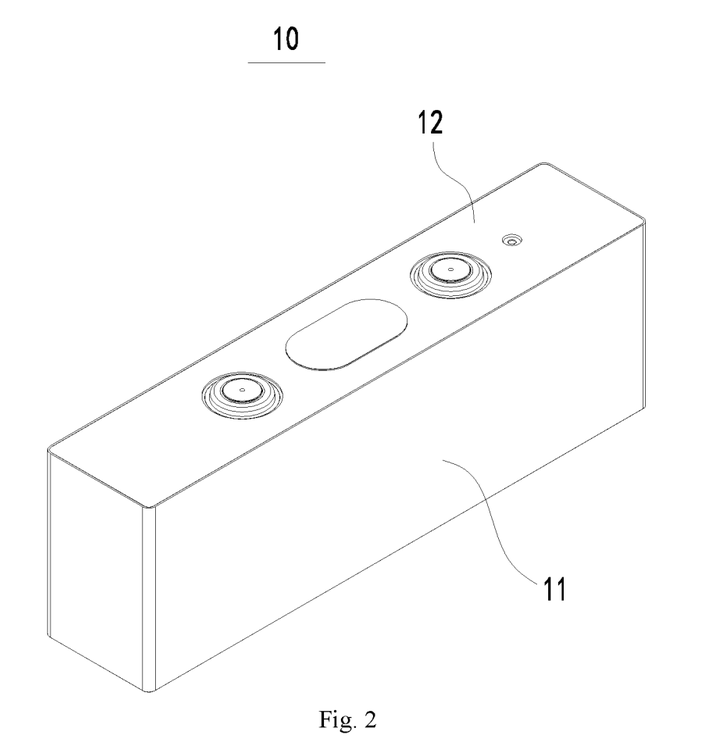
FIG. 2 is a structural schematic diagram of a secondary battery according to an embodiment of the disclosure.
Figure 3:
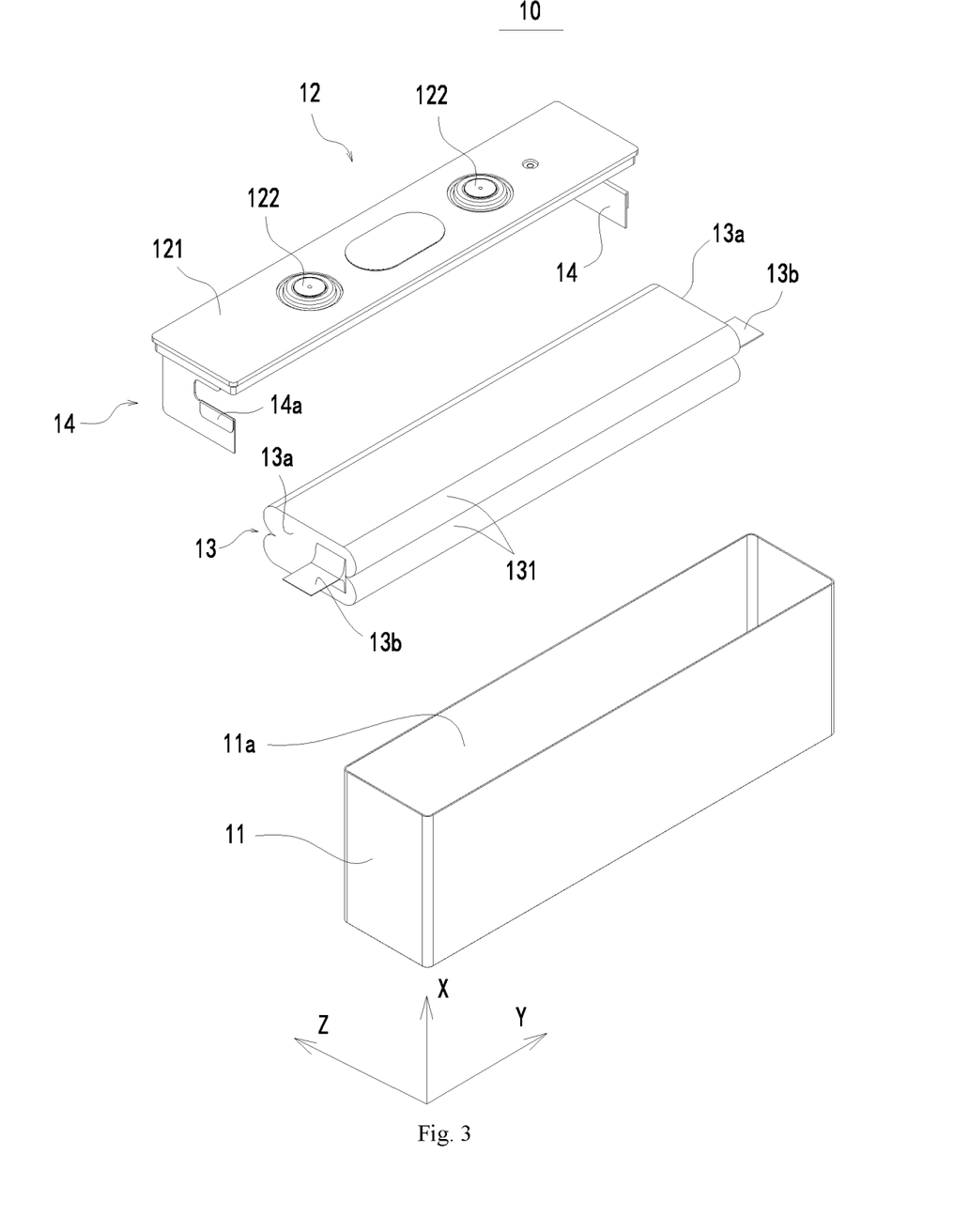
FIG. 3 is an exploded structural view of a secondary battery according to an embodiment of the disclosure.

Referring to FIGS. 2 and 3, the secondary battery 10 according to embodiments of the disclosure comprises a case 11, an electrode assembly 13 disposed in the case 11, and a cap assembly 12 that is sealingly connected with the case 11.

The case 11 according to the embodiment may be formed in a shape of quadrangular prism or in other shapes. The case 11 comprises a receiving hole 11a having an opening. The receiving hole 11a can accommodate the electrode assembly 13 and electrolyte. The case 11 can be made of a material such as aluminum, aluminum alloy and plastic.

The electrode assembly 13 according to the embodiment comprises two end surfaces 13a opposite to each other in a first direction Y perpendicular to an axial direction X of the receiving hole 11a and tabs 13b extending from each end surface 13a. According to the embodiment, each tab 13b extends from an end surface 13a of the electrode assembly 13. Each electrode assembly 13 comprises two tabs 13b opposite to each other in the first direction Y, wherein a tab 13b is a positive tab, and the other is a negative tab.

Figure 4:
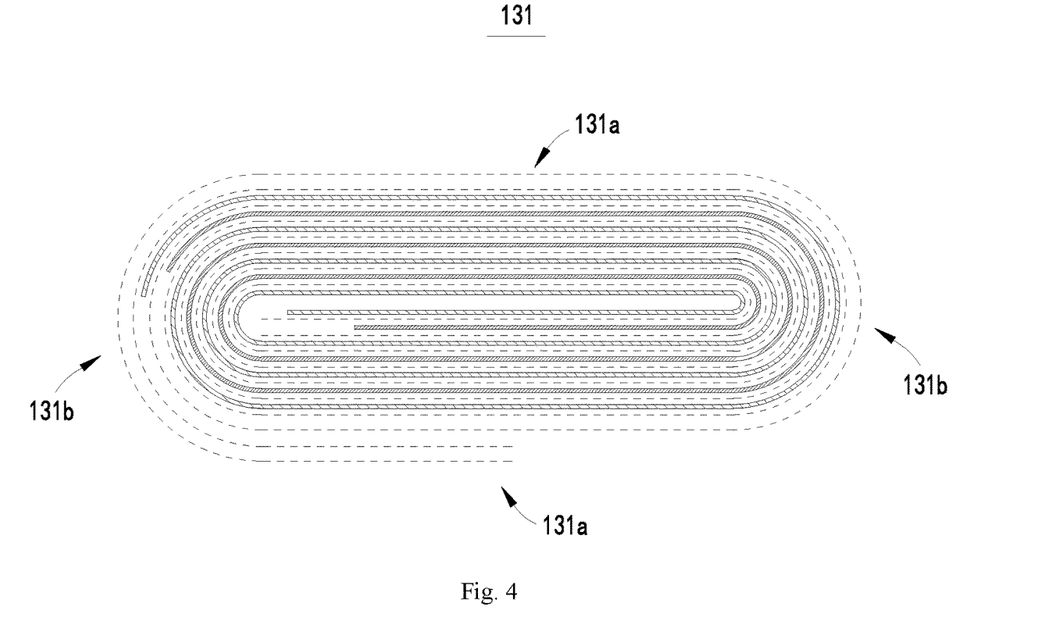
FIG. 4 is a structural section view of a body of an electrode assembly according to an embodiment of the disclosure.

Referring to FIGS. 2 to 4, the electrode assembly 13 according to the embodiment comprises two or more electrode units 131 stacked in the axial direction X of the receiving hole 11a. According to the embodiment, a body of the electrode unit 131 and a sub-tab connected to the body can be formed by stacking or winding a first electrode plate, a second electrode plate, and a separator together. The separator is an insulator between the first electrode plate and the second electrode plate. The electrode unit 131 according to the embodiment comprises a layer of separator, a layer of first electrode plate, another layer of separator and a layer of second electrode plate. In the embodiment, the description is made by exemplarily taking the first electrode plate as a positive electrode plate and the second electrode plate as a negative electrode plate. Similarly, in other embodiments, the first electrode plate may be a negative electrode plate, and the second electrode plate may be a positive electrode plate. Furthermore, a positive active material is coated on a coating region of the positive electrode plate, while a negative active material is coated on a coating region of the negative electrode plate. An uncoated region extending from the body serves as the sub-tab. An electrode unit 131 comprises two sub-tabs opposite to each other in the first direction Y, i.e., a positive tab and a negative tab. The positive tab extends from the coating region of the positive electrode plate while the negative tab extends from the coating region of the negative electrode plate. The first direction Y is perpendicular to the axial direction X. The term "perpendicular" here is not limited to a strict perpendicularity in a mathematical sense. The end surface 13a of each electrode assembly 13 comprises sub-end-surfaces 131c of the respective electrode units 131, while tabs 13b of an electrode assembly 13 comprise sub-tabs 131d of respective electrode units 131. In an embodiment, referring to FIG. 3, the electrode unit 131 has a flat shape comprising two wide surfaces and two narrow surfaces 131b connecting the two wide surfaces 131a. The two wide surfaces 131a are disposed opposite to each other in the axial direction X. The wide surfaces 131a and the narrow surfaces 131b are alternately arranged.

The cap assembly 12 according to the embodiment is sealingly connected with the case 11 to close the opening. In an embodiment, the cap assembly 12 comprises a cap plate 121 and electrode terminals 122. The cap assembly 12 is sealingly connected with the case 11 through the cap plate 121. The electrode terminal 122 is disposed on the cap plate 121 and is electrically connected to the electrode assembly 13 through a current collecting unit.

Referring to FIG. 2, the secondary battery 10 according to the embodiment of the disclosure comprises a current collecting unit 14 for connecting the electrode assembly 13 and the cap assembly 12. In an embodiment, the tab 13b is connected to the electrode terminal 122 through the current collecting unit 14. The current collecting unit 14 according to the embodiment comprises a first sheet 141 and a first current collecting sheet 14a connected to the first sheet 141. Both the first sheet 141 and the first current collecting sheet 14a extend in the axial direction X. In an embodiment, in the X direction, both a thickness direction of the first current collecting sheet 14a and a thickness direction of the first sheet 141 are identical with the first direction Y. Furthermore, the first current collecting sheet 14a and the first sheet 141 are disposed to at least partly overlap with each other. In an embodiment, at least a part of the first sheet 141 is disposed between an end surface 13a of the electrode assembly 13 and the case 11, while the first current collecting sheet 14a is connected to a part of the first sheet 141 between the end surface 13a of the electrode assembly 13 and the case 11. The tab 13b is bent with respect to the first direction Y and electrically connected to the first current collecting sheet 14a. In an embodiment, the bent portion of the tab 13b extends in the axial direction X. Optionally, in the first direction Y, the first current collecting sheet 14a, the first sheet 141 and a portion of the tab 13b connected to the first current collecting sheet 14a at least partly overlap with each other.

According to embodiments of the disclosure, the secondary battery 10 comprises a case 11 having a receiving hole 11a, an electrode assembly 13 disposed in the case 11 and a current collecting unit 14 for inputting electric energy to the electrode assembly 13 or outputting electric energy from the electrode assembly 13. The current collecting unit 14 comprises a first sheet 141 and a first current collecting sheet 14a connected to the first sheet 141. Both the first current collecting sheet 14a and the first sheet 141 extend in the axial direction X of the receiving hole 11a. Since the current collecting unit 14 according to embodiments of the disclosure comprises the first sheet 141 and the first current collecting sheet 14a, the first sheet 141 and the first current collecting sheet 14a are small in size and occupy small space in the case 11. Therefore, it is advantageous to save the internal space of the case 11 and increase the energy density of the secondary battery 10. Moreover, since the first current collecting sheet 14a extends in the axial direction X, the occupied space in the first direction Y can be reduced, and it is also advantageous to increase the energy density of the secondary battery 10. Furthermore, the current collecting unit 14 according to embodiments of the disclosure can electrically connect the tab 13b of the electrode assembly 13 to the electrode terminal 122 of the cap assembly 12. The first current collecting sheet 14a comprises the first current collecting sheet 14a for electrically connecting the tab 13b. The first current collecting sheet 14a can be fixedly connected to the corresponding tab 13b. The current collecting unit 14 according to the embodiment is fixedly connected to the tab 13b through the first current collecting sheet 14a disposed on the first sheet 141. When the current collecting unit 14 according to the embodiment is in use, the first current collecting sheet 14a is far from the electrode assembly 13. Therefore, there will be a clearance space such that the first current collecting sheet 14a and the tab 13b can be welded through a welding device. Accordingly, welding difficulty can be effectively reduced and welding quality can be improved. Furthermore, it is advantageous to improve stability of the connection between the first current collecting sheet 14a and the tab 13b such that they cannot be easily separated from each other, and the stability and safety of the battery module 20 in use can be ensured.

According to embodiments of the disclosure, the first current collecting sheet 14a comprises a first connecting end 14c connected to the first sheet 141. The first connecting end 14c extends in a second direction Z perpendicular to both the axial direction X and the first direction Y. The second direction Z is parallel to a thickness direction of the secondary battery 10. The first current collecting sheet 14a is connected to the first sheet 141 through the first connecting end 14c. Since the first connecting end 14c extends in the second direction Z, it is ensured that the first current collecting sheet 14a has a large surface area away from the electrode assembly 13, and thus the connection of the tab 13b and the first current collecting sheet 14a is more reliable. In an embodiment, the length of the tab 13b in the second direction Z is greater than its thickness in the axial direction X, and the length of the first current collecting sheet 14a in the second direction Z is greater than its thickness in the first direction Y. Thereby, it is ensured there is a large connection area between the first current collecting sheet 14a and the tab 13b. In one example, the first current collecting sheet 14a has a rectangular shape. Alternatively, the first current collecting sheet 14a and the tab 13b according to the embodiment may be connected by ultrasonic welding.

According to embodiments of the disclosure, the first current collecting sheet 14a is located on a side of the first sheet 141 close to the case 11. The tab 13b is fixedly connected to a surface of the first current collecting sheet 14a away from the first sheet 141. The first sheet 141 is disposed between the first current collecting sheet 14a and the end surface 13a of the electrode assembly 13. The first current collecting sheet 14a does not contact with the end surface 13a of the electrode assembly 13, thus it is prevented that the first current collecting sheet 14a scratches or damages the electrode unit 131 in the electrode assembly 13 during the mounting or operation process. Since the tab 13b is fixedly connected to a surface of the first current collecting sheet 14a away from the first sheet 141, a free end of the tab 13b will not be folded during the mounting or operation process to contact with the end surface 13a of the electrode assembly 13. Thereby, it is advantageous to reduce the possibility that the tab 13b is folded to insert into the end surface 13a and thus cause structural damage or breakage of the electrode unit 131. Furthermore, the tab 13b, the first current collecting sheet 14a and the first sheet 141 in the first direction Y have a small total thickness, thus the occupied space between the end surface 13a and the case 11 can be effectively reduced, and the energy density of the secondary battery 10 can be effectively improved.

Figure 5:
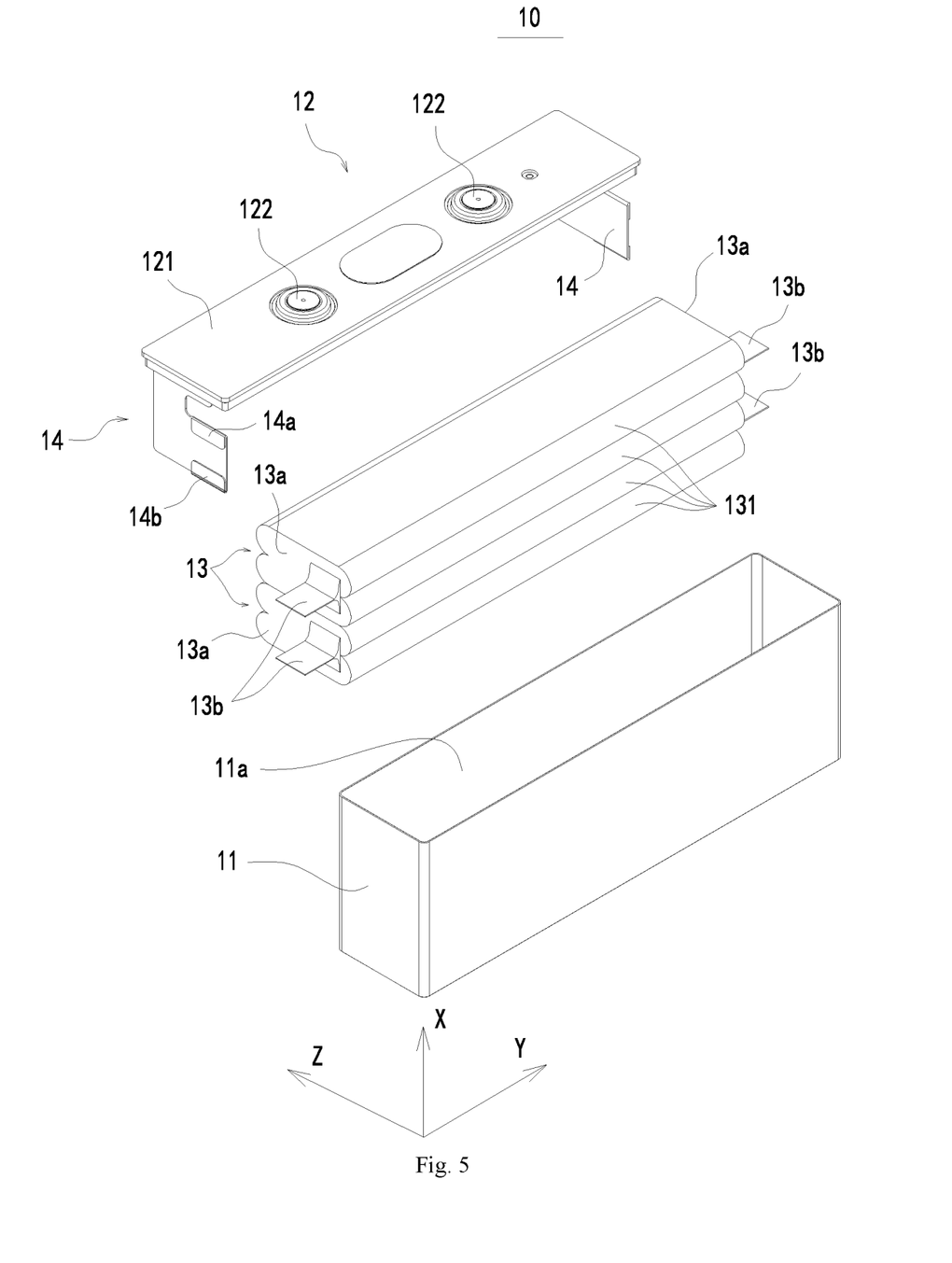
FIG. 5 is an exploded structural view of a secondary battery according to another embodiment of the disclosure.
Figure 6:
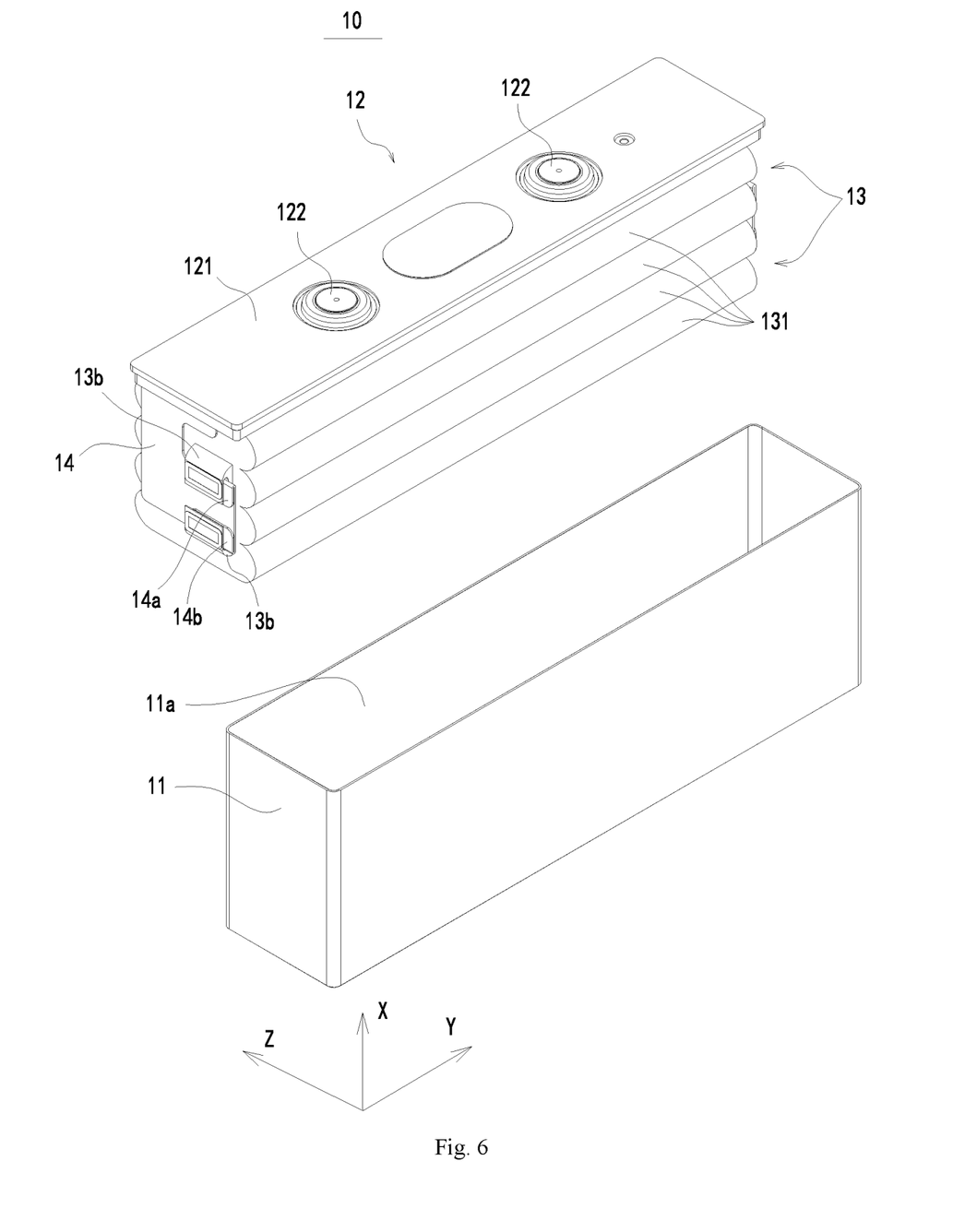
FIG. 6 is a structural schematic diagram of a fixed connection of a current collecting unit and a tab in FIG. 5.

Referring to FIGS. 5 and 6, the current collecting unit 14 according to the embodiment further comprises a second current collecting sheet 14b connected to the first sheet 141. Both the first current collecting sheet 14a and the second current collecting sheet 14b extend in the axial direction X, and they at least partially overlap with each other in the axial direction X. Thereby, the dimension of the first current collecting sheet 14a and the second current collecting sheet 14b in the second direction Z can be reduced. The second current collecting sheet 14b comprises a second connecting end extending in the second direction Z. The second current collecting sheet 14b is connected to the first sheet 141 through the second connecting end. There are two electrode assemblies 13. The two electrode assemblies 13 are stacked in the axial direction X. The tab 13b of one of the electrode assemblies 13 is electrically connected to the first current collecting sheet 14a, and the tab 13b of the other of the electrode assemblies 13 is electrically connected to the second current collecting sheet 14b. The tabs 13b of the two electrode assemblies 13 at a same side are connected through the first current collecting sheet 14a and the second current collecting sheet 14b such that current collection can be achieved. In this way, on the one hand, it can be avoided that when a plurality of electrode units 131 are connected to the first current collecting sheet 14a through one tab 13b, the temperature at the connection between the tab 13b and the first current collecting sheet 14a will be excessively high. On the other hand, the tab 13b extends a short distance to fixedly connect with the corresponding first current collecting sheet 14a or the corresponding second current collecting sheet 14b, such that the tab 13b does not need to extend a long distance from the end surface 13a for being connected to the first current collecting sheet 14a. Therefore, the electrode unit 131 can have uniform size and uniform manufacturing process, and it is possible to reduce the manufacturing difficulty and cost.

In an embodiment, each electrode assembly 13 comprises two electrode units 131. The electrode unit 131 comprises a sub-end-surface 131c and a sub-tab 131d extending from the sub-end-surface 131c. The two sub-end-surfaces 131c at a same side form the end surface 13a, while the two sub-tabs 131d at a same side connect together and form the tab 13b. The sub-tab 131d of one electrode unit 131 extends in the axial direction from a region of the sub-end-surface 131c close to another electrode unit 131. Thereby, the respective sub-tabs 131d of the two electrode units 131 are close to each other and extend short distances to connect together and form the tab 13b that will be fixedly connected to the first current collecting sheet 14a and the second current collecting sheet 14b. Thus, on the one hand, the sub-tab 131d do not extend an excess distance to have a redundant length. When there is a redundant sub-tab 131d, the sub-tab 131d is likely to be broken and fractured at the stress concentration region. On the other hand, the extending dimension of the sub-tab 131d is controlled within a small range. The occupied space of the tab 13b formed by the sub-tabs 131d is reduced, and the energy density of the secondary battery 10 is increased.

According to embodiments of the disclosure, both the first current collecting sheet 14a and the second current collecting sheet 14b are located on a same side of the first sheet 141 close to the case 11. Both the first current collecting sheet 14a and the second current collecting sheet 14b extend in the axial direction X. The first current collecting sheet 14a and the second current collecting sheet 14b extend toward each other such that the first current collecting sheet 14a and the second current collecting sheet 14b are spaced apart from the end surface 13a by the first sheet 141. Thereby, neither the first current collecting sheet 14a nor the second current collecting sheet 14b will contact with the end surface 13a of the electrode assembly 13. Since the first current collecting sheet 14a and the second current collecting sheet 14b extend toward each other, the occupied space in the axial direction X can be reduced, and it is advantageous to increase the energy density of the secondary battery 10. Alternatively, the thickness direction of the second current collecting sheet 14b is identical with the thickness direction of the first sheet 141, and their thickness directions are identical with the first direction Y. The second current collecting sheet 14b and the first current collecting sheet 14a have the same structure. Alternatively, the second current collecting sheet 14b and the tab 13b according to the embodiment may be connected by ultrasonic welding.

Figure 7:
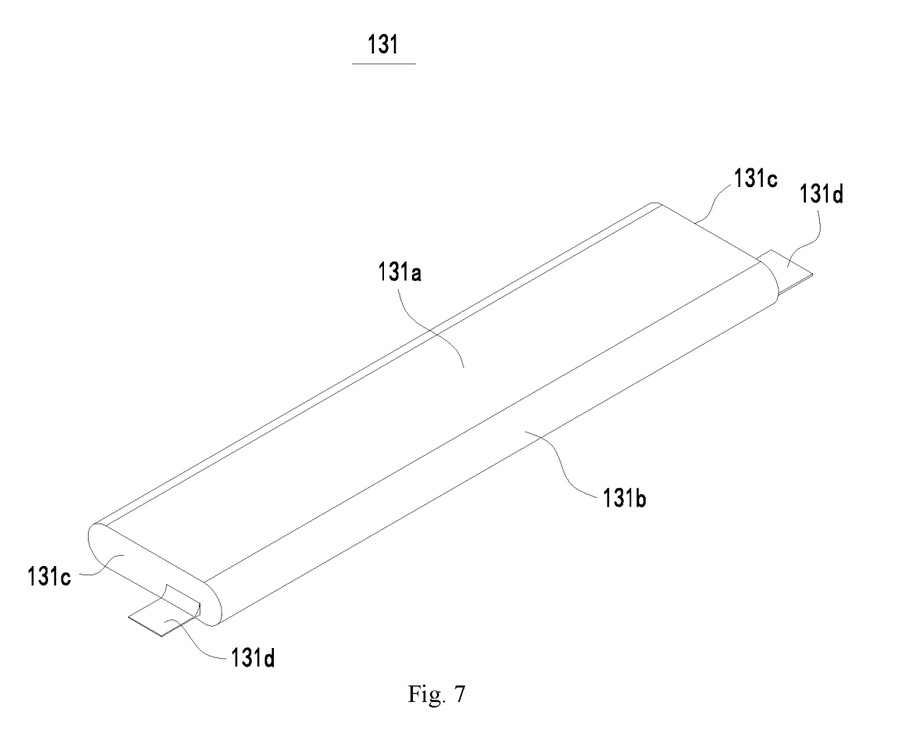
FIG. 7 is a structural schematic diagram of an electrode unit according to an embodiment of the disclosure.

Referring to FIG. 7, the first sheet 141 according to the embodiment comprises a body portion 141a extending in the axial direction X and a first extending portion 141b connected to the body portion 141a. The first extending portion 141b extends outside of the body portion 141a in the second direction Z perpendicular to both the axial direction X and the first direction Y. The first current collecting sheet 14a and the second current collecting sheet 14b are connected to two respective ends of the first extending portion 141b in the axial direction X. The two electrode assemblies 13 are stacked in the axial direction X, and thus the respective tabs 13b are spaced apart in the axial direction X. The two tabs 13b on a same side of the electrode assembly 13 can pass over the two opposite ends of the first extending portion 141b in the axial direction X, and then be fixedly connected to the first current collecting sheet 14a and the second current collecting sheet 14b, respectively. Since the first current collecting sheet 14a and the second current collecting sheet 14b are respectively connected to the two opposite ends of the first extending portion 141b, an extended size of the tab 13b does not need to be too long to be fixedly connected with the first current collecting sheet 14a or the second current collecting sheet 14b. Therefore, the extended length of the tab 13b can be effectively shortened. It is advantageous to reduce the occupied space of the tab 13b, improve the energy density of the secondary battery 10, and effectively reduce the manufacturing cost.

Figure 8:
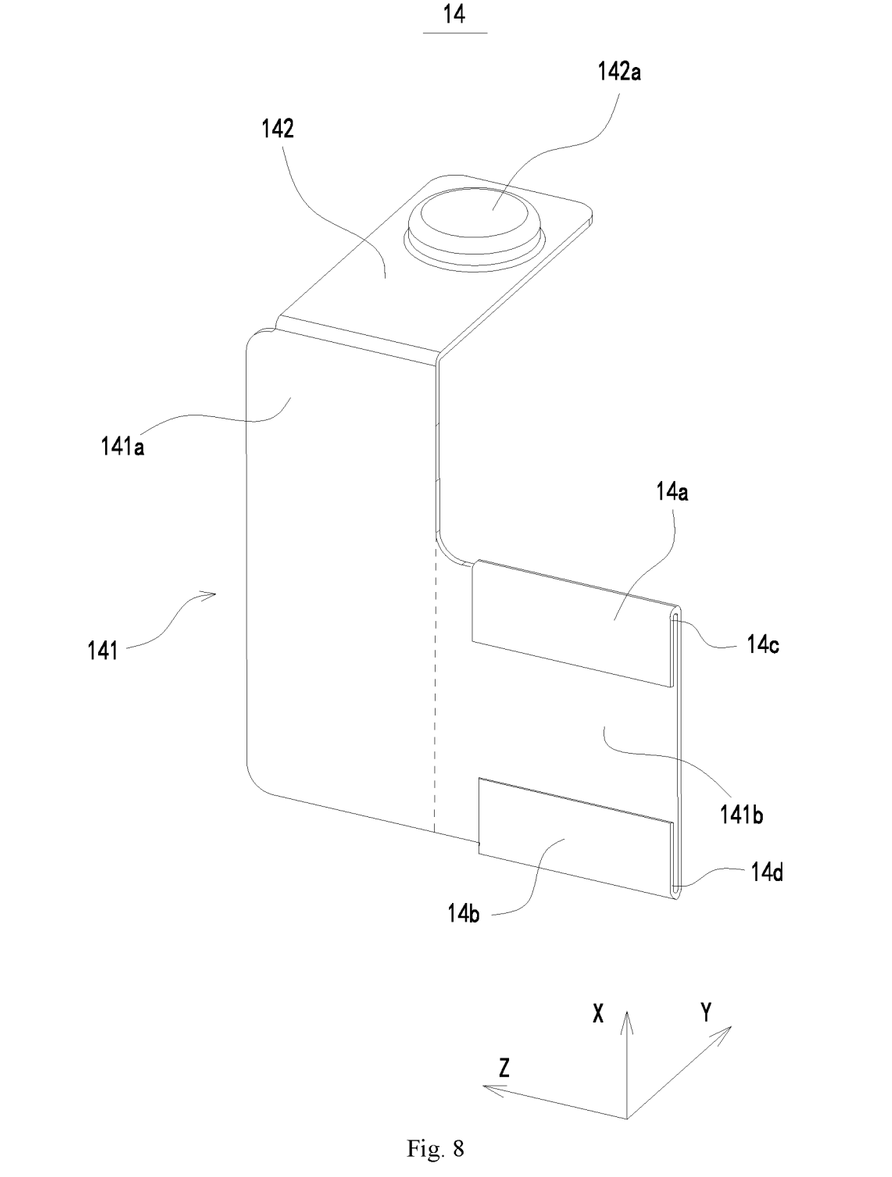
FIG. 8 is a structural schematic diagram of a current collecting unit according to an embodiment of the disclosure.
Figure 9:
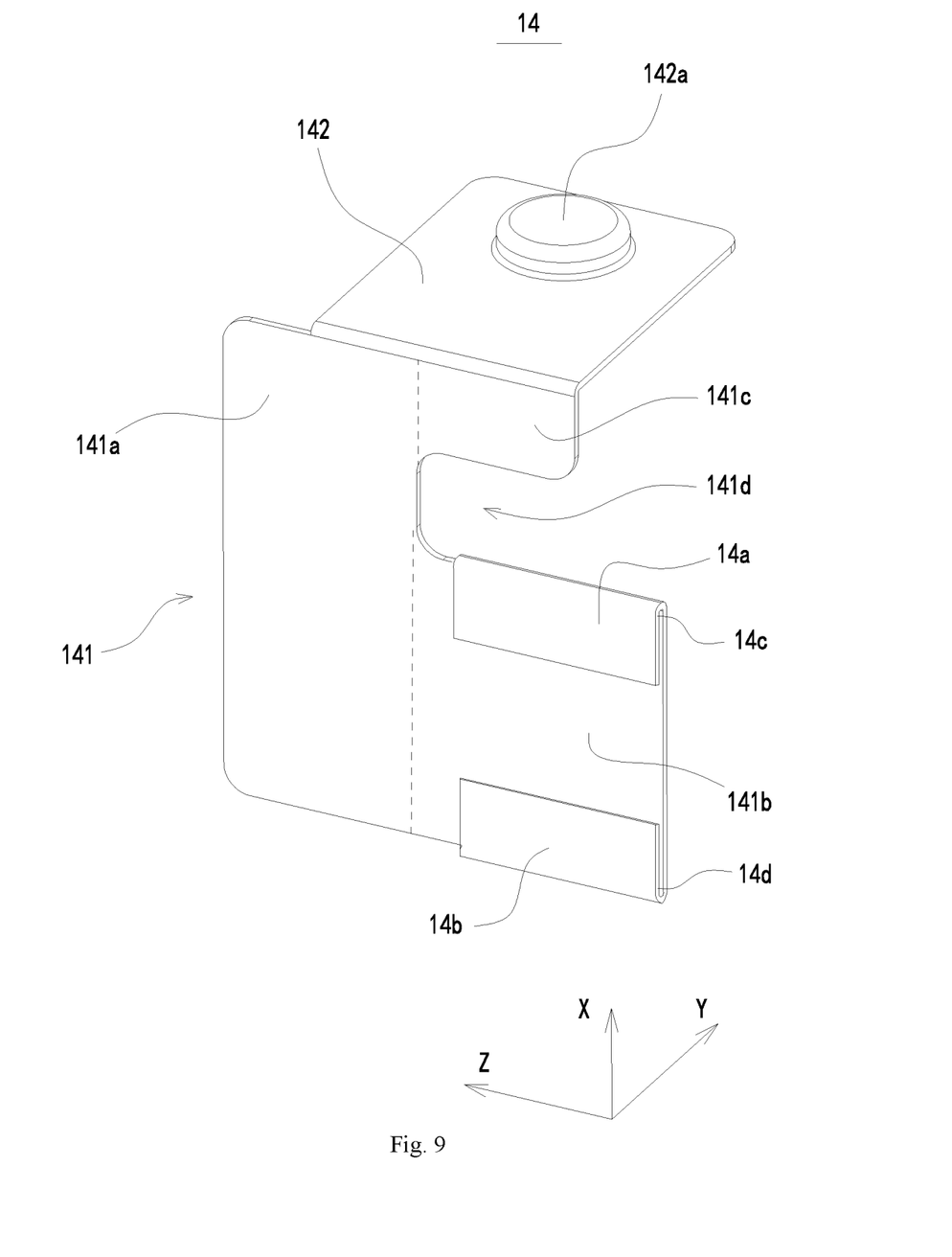
FIG. 9 is a structural schematic diagram of a current collecting unit according to another embodiment of the disclosure.

Referring to FIG. 8, the first sheet 141 according to the embodiment further comprises a second extending portion 141c connected to the body portion 141a. The first extending portion 141b and the second extending portion 141c are spaced apart in the axial direction X to form a clearance notch 141d. In the axial direction X of the receiving hole 11a, the clearance notch 141d is located on a side of the first current collecting sheet 14a close to the cap assembly 12. The tab 13b can pass through the clearance notch 141d to be connected to the first current collecting sheet 14a. The first sheet 141 may be electrically connected to the electrode terminal 122 through the body portion 141a and the second extending portion 141c. The second extension portion 141c can improve the strength and rigidity of the first sheet 141 and the current passing area of the first sheet 141. In an embodiment, the clearance notch 141d extends in the second direction Z perpendicular to both the axial direction X and the first direction Y and passes beyond the first current collecting sheet 14a. Therefore, when the tab 13b passes through the clearance notch 141d, the tab 13b will not contact with the body portion 141a, and thus the tab 13b will not be pressed by the body portion 141a, which reduces the possibility that the tab 13b deforms or is damaged due to pressure from the body portion 141a. The possibility can be reduced that the displacement of the tab 13b leads to an inaccurate and unstable connection region between the tab 13b and the first current collecting sheet 14a. In one example, the clearance structure can be a slot extending in the second direction Z.

In an embodiment, the second extending portion 141c and at least a part of the first extending portion 141b are disposed to overlap with each other in the axial direction X. Thus, without increasing the overall size of the first sheet 141, it is possible to ensure that the clearance notch 141d is designed on the first sheet 141 while ensuring that a connection transition region between the body portion 141a and the second sheet have a large current passing area. On one hand, it is advantageous to improve the structural compactness of the first sheet 141 and increase the energy density of the secondary battery 10. On the other hand, it is also ensured there is a good current passing ability between the first sheet 141 and the second sheet, and it is possible to improve the stability and reliability of secondary battery 10 in use.

Referring to FIG. 7 or FIG. 8, the current collecting unit 14 according to the embodiment further comprises a second sheet 142 connected to the cap assembly 12. The body portion 141a and the second sheet 142 are disposed to intersect with each other. The second sheet 142 extends in the first direction Y. According to the embodiment, the thickness direction of the second sheet 142 is identical with the axial direction X. The second sheet 142 comprises a protrusion 142a away from the electrode assembly 13. The second sheet 142 is electrically connected to the electrode terminal 122 in the cap assembly 12 through the protrusion 142a. In an embodiment, the first sheet 141, the second sheet 142, the first current collecting sheet 14a and the second current collecting sheet 14b are integrally formed. Thereby, on one hand, the overall structural strength and impact resistance of the current collecting unit 14 can be ensured. On the other hand, the current collecting unit 14 can be manufactured with an integral molding process, which reduces the number of processing steps and reduces the manufacturing cost.

In an embodiment, there can be only one current collecting unit 14. Two tabs 13b of an electrode assembly 13 comprise a positive tab and a negative tab. The first current collecting sheet 14a of the current collecting unit 14 may be electrically connected to the positive tab or negative tab. In another embodiment, referring to FIG. 3 or FIG. 5, there are two current collecting units 14. The two current collecting units 14 are spaced apart in the first direction Y. In the first direction Y, the electrode assembly 13 is disposed between the two current collecting units 14. The body of the electrode unit 131 of the electrode assembly 13 is disposed between the two current collecting units 14, and the two tabs 13b of the electrode assembly 13 correspond to the two current collecting units 14, respectively. One tab 13b is connected to one current collecting unit 14, and the other tab 13b is connected to the other current collecting unit 14. In the embodiment, the two current collecting units 14 are electrically connected to the corresponding tabs 13b through the first current collecting sheets 14a.

In an embodiment, the electrode assembly 13 comprises two electrode units 131. The electrode unit 131 comprises two wide surfaces 131a and two narrow surfaces 131b connecting the two wide faces 131a. The two wide surfaces 131a are disposed opposite to each other in the axial direction X. The wide surfaces 131a and the narrow surfaces 131b are alternately disposed. The tab 13b extends from a region of the end surface 13a close to the two adjacent wide surfaces 131a of the two electrode units 131. Therefore, in the axial direction X, the tab 13b is substantially in a central region of the end surface 13a, it is ensured that the two sub-tabs 131d extending from the two electrode units 131 have substantially the same size. The electrode units 131 can be manufactured in identical process, and thus the manufacturing cost can be reduced.

The battery module 20 according to embodiments of the disclosure comprises a plurality of secondary batteries 10 arranged side by side in a same direction. The electrode units 131 in the respective secondary batteries 10 according to the embodiment are stacked in the axial direction X of the receiving hole 11a of the case 11. When the electrode unit 131 according to the embodiment expands, it mainly expands and deforms in the axial direction X of the receiving hole 11a, and it has a small expansion in a direction in which the secondary batteries 10 are arranged. Thus, a resultant expansion force accumulated in an arrangement direction of the respective secondary batteries 10 is small. In the arrangement direction of the secondary batteries 10, the battery module 20 does not need to use a structural member having a higher strength to restrain and counteract the expansion force, and a structural member with a lower strength may be used to restrain and counteract the expansion force. Thereby, the weight of the battery module 20 can be effectively reduced, the battery module 20 may have a more compact structure, and the energy density of the battery module 20 can be effectively increased. Furthermore, the battery module 20 has a small expansion or has no expansion in a thickness direction of the secondary battery 10, thus the safety in use can be effectively improved.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A secondary battery comprising:
   a case comprising a receiving hole having an opening and extending in an axial direction;
   a cap assembly sealingly connected with the case to close the opening;
   an electrode assembly disposed in the receiving hole, wherein the electrode assembly comprises two end surfaces opposite to each other in a first direction perpendicular to the axial direction of the receiving hole and a tab extending from each end surface, and the electrode assembly comprises two or more electrode units which are stacked in the axial direction, the electrode unit comprises a flat shape comprising two wide surfaces and two narrow surfaces for connecting the two wide surfaces, wherein the two wide surfaces are disposed opposite to each other in the axial direction, the wide surfaces and the narrow surfaces are alternatively disposed; and
   a current collecting unit comprising a first sheet and a first current collecting sheet connected to the first sheet, wherein both the first sheet and the first current collecting sheet extend in the axial direction, the first current collecting sheet is bent with respect to the first sheet so that the first current collecting sheet and the first sheet are disposed to at least partly overlap with each other in the first direction and the first current collecting sheet is disposed at a side of the first sheet close to the case in the first direction, and the tab is bent with respect to the first direction and is electrically connected to the first current collecting sheet and is fixedly connected to a surface of the first current collecting sheet away from the first sheet.

2. The secondary battery according to claim 1, wherein the first current collecting sheet comprises a first connecting end connected to the first sheet, and the first connecting end extends in a second direction perpendicular to both the axial direction and the first direction.

3. The secondary battery according to claim 1, wherein the current collecting unit further comprises a second current collecting sheet connected to the first sheet, wherein both the first current collecting sheet and the second current collecting sheet extend in the axial direction, the first current collecting sheet and the second current collecting sheet are disposed to at least partly overlap with the first sheet in the axial direction, and there are two electrode assemblies stacked in the axial direction, wherein the tab of one of the two electrode assemblies is directly connected to the first current collecting sheet, and the tab of the other of the two electrode assemblies is directly connected to the second current collecting sheet.

4. The secondary battery according to claim 3, wherein both the first current collecting sheet and the second current collecting sheet are disposed at a side of the first sheet close to the case, and the first current collecting sheet and the second current collecting sheet extend toward each other.

5. The secondary battery according to claim 3, wherein the first sheet comprises a body portion extending in the axial direction and a first extending portion connected to the body portion, and the first current collecting sheet comprises a first connecting end connected to the first extending portion of the first sheet, wherein the first extending portion extends outside of the body portion in the second direction perpendicular to both the axial direction and the first direction, and the first current collecting sheet and the second current collecting sheet are connected to two ends of the first extending portion in the axial direction, respectively.

6. The secondary battery according to claim 5, wherein the first sheet further comprises a second extending portion connected to the body portion, wherein the first extending portion and the second extending portion are spaced apart in the axial direction to form a clearance notch, and in the axial direction, the clearance notch is disposed at a side of the first current collecting sheet close to the cap assembly, and the tab is able to pass through the clearance notch to connect with the first current collecting sheet.

7. The secondary battery according to claim 5, wherein the current collecting unit further comprises a second sheet connected to the cap assembly, wherein the body portion and the second sheet are disposed to intersect with each other, and the first sheet, the second sheet, the first current collecting sheet and the second current collecting sheet are integrally formed.

8. The secondary battery according to claim 6, wherein the clearance notch extends in the second direction beyond the first current collecting sheet so that the tab will not make contact with the body portion when the tab passes through the clearance notch.

9. The secondary battery according to claim 6, wherein in the axial direction, at least a part of the first extending portion is aligned with the second extending portion.

10. The secondary battery according to claim 1, wherein there are two current collecting units, wherein in the first direction, the electrode assembly is disposed between the two current collecting units, and the two current collecting units are connected to respective tabs through the first current collecting sheets.

11. The secondary battery according to claim 1, wherein there are two electrode assemblies stacked in the axial direction, wherein each electrode assembly comprises two electrode units, each electrode unit comprises a sub-end-surface and a sub-tab extending from the sub-end-surface, two sub-end-surfaces at a same side form the end surface, two sub-tabs at a same side connect together and form the tab, and the sub-tab of one electrode unit extends in the axial direction from a side of the sub-end-surface close to the other electrode unit.

12. The secondary battery according to claim 11, wherein the tab extends from a region of the end surface close to the two adjacent wide surfaces of the two electrode units.

13. A battery module comprising two or more secondary batteries which are arranged side by side, wherein the secondary battery comprises:
   a case comprising a receiving hole having an opening and extending in an axial direction;
   a cap assembly sealingly connected with the case to close the opening;
   an electrode assembly disposed in the receiving hole, wherein the electrode assembly comprises two end surfaces opposite to each other in a first direction perpendicular to an axial direction of the receiving hole and a tab extending from each end surface, and the electrode assembly comprises two or more electrode units which are stacked in the axial direction, the electrode unit comprises a flat shape comprising two wide surfaces and two narrow surfaces for connecting the two wide surfaces, wherein the two wide surfaces are disposed opposite to each other in the axial direction, the wide surfaces and the narrow surfaces are alternatively disposed; and
   a current collecting unit comprising a first sheet and a first current collecting sheet connected to the first sheet, the first current collecting sheet is bent with respect to the first sheet so that the first current collecting sheet and the first sheet are disposed to at least partly overlap with each other in the first direction and the first current collecting sheet is disposed at a side of the first sheet close to the case in the first direction, wherein both the first sheet and the first current collecting sheet extend in the axial direction, and the tab is bent with respect to the first direction and is electrically connected to the first current collecting sheet and is fixedly connected to a surface of the first current collecting sheet away from the first sheet.

14. The battery module according to claim 13, wherein the first current collecting sheet comprises a first connecting end connected to the first sheet, and the first connecting end extends in a second direction perpendicular to both the axial direction and the first direction.

15. The battery module according to claim 13, wherein the current collecting unit further comprises a second current collecting sheet connected to the first sheet, wherein both the first current collecting sheet and the second current collecting sheet extend in the axial direction, the first current collecting sheet and the second current collecting sheet are disposed to at least partly overlap with each other in the axial direction, and there are two electrode assemblies stacked in the axial direction, wherein the tab of one of the two electrode assemblies is directly connected to the first current collecting sheet, and the tab of the other of the two electrode assemblies is directly connected to the second current collecting sheet.

16. The battery module according to claim 15, wherein both the first current collecting sheet and the second current collecting sheet are disposed at a side of the first sheet close to the case, and the first current collecting sheet and the second current collecting sheet extend toward each other.

17. The battery module according to claim 15, wherein the first sheet comprises a body portion extending in the axial direction and a first extending portion connected to the body portion, and the first current collecting sheet comprises a first connecting end connected to the first extending portion of the first sheet, wherein the first extending portion extends outside of the body portion in the second direction perpendicular to both the axial direction and the first direction, and the first current collecting sheet and the second current collecting sheet are connected to two ends of the first extending portion in the axial direction, respectively.

* * * * *